United States Patent [19]
Nam

[11] Patent Number: 5,859,724
[45] Date of Patent: Jan. 12, 1999

[54] METHOD FOR THE MANUFACTURE OF A SHORT-CIRCUIT FREE ACTUATED MIRROR ARRAY

[75] Inventor: Yun-Woo Nam, Seoul, Rep. of Korea

[73] Assignee: Daewoo Electronics Co., Ltd., Seoul, Rep. of Korea

[21] Appl. No.: 767,439

[22] Filed: Dec. 16, 1996

[30] Foreign Application Priority Data

Dec. 22, 1995 [KR] Rep. of Korea .................. 1995 54927

[51] Int. Cl.$^6$ .................................................. G02B 26/00
[52] U.S. Cl. ......................... 359/295; 359/291; 359/221; 359/846; 359/855; 310/328; 310/366
[58] Field of Search .................................. 359/291, 850, 359/366, 295, 221, 224, 213, 214, 846, 848, 855; 310/328, 333, 366

[56] References Cited

U.S. PATENT DOCUMENTS 5,606,452 2/1997 Min ......................................... 359/295

*Primary Examiner*—Ponnathapura Achutamurthy
*Assistant Examiner*—P. Ponnaluri
*Attorney, Agent, or Firm*—Pennie & Edmonds LLP

[57] ABSTRACT

A method for manufacturing an array of thin film actuated mirrors, which is capable of minimizing the effect of a heat treatment involved in the manufacture of the thin film actuated mirror, is disclosed. The method includes the steps of: providing an active matrix having an array of connecting terminals; forming a contact member on top of each of the connecting terminals; forming a thin film sacrificial layer on top of the active matrix; forming an array of actuating structures on top of the thin film sacrificial layer, wherein each of the actuating structures has a first thin film electrode, a thin film electrodisplacive member, a second thin film electrode and an elastic member having a contact hole; and removing the thin film sacrificial layer, thereby forming the array of thin film actuated mirrors. Since the contact member formed on top of the connecting terminal reduce the depth of the contact hole, cracks may not form on the thin film electrodisplacive member during the heat treatment thereof, thereby preventing the thin film electrodes in each of the actuating structures from coming into an electrical contact with each other, which, in turn, prevents a short-circuit therebetween.

13 Claims, 7 Drawing Sheets

METHOD FOR THE MANUFACTURE OF A SHORT-CIRCUIT FREE ACTUATED MIRROR ARRAY

FIELD OF THE INVENTION

The present invention relates to an optical projection system; and, more particularly, to an improved method for the manufacture of an array of M×N thin film actuated mirrors for use in the system.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in manufacturing an array 100 of M×N thin film actuated mirrors 101, wherein M and N are integers, disclosed in a commonly owned application, U.S. Ser. No. 08/598,478, entitled "METHOD FOR FORMING AN ARRAY OF THIN FILM ACTUATED MIRRORS", U.S. Pat. No. 5,677,785.

The process for the manufacture of the array 100 begins with the preparation of an active matrix 10 including a substrate 12 with an array of M×N connecting terminals 14 and an array of M×N transistors (not shown), wherein each of the connecting terminals 14 is electrically connected to a corresponding transistor in the array of transistors.

In an ensuing step, there is deposited a passivation layer 70, made of, e.g., PSG or silicon nitride, and having a thickness of 0.1–2 μm, on top of the active matrix 10 by using, e.g., a CVD or a spin coating method.

Thereafter, an etchant stopping layer 80, made of a nitride, and having a thickness of 0.1–2 μm, is deposited on top of the passivation layer 70 by using, e.g., a sputtering or a CVD method.

In a subsequent step, there is deposited on top of the etchant stopping layer 80 a thin film sacrificial layer 20, having a thickness of 0.1–2 μm, and made of a metal, e.g., copper (Cu) or nickel (Ni), a phosphor-silicate glass (PSG) or a poly-Si. The thin film sacrificial layer 20 is deposited by using a sputtering or an evaporation method if the thin film sacrificial layer 20 is made of a metal, a chemical vapor deposition (CVD) method or a spin coating method if the thin film sacrificial layer 20 is made of a PSG, or a CVD method if the thin film sacrificial layer 20 is made of a poly-Si.

Thereafter, there is formed an array of M×N pairs of empty cavities (not shown) on the thin film sacrificial layer 20 by using an etching method, as shown in FIG. 1A. One of the empty cavities in each pair encompasses one of the connecting terminals 14.

Subsequently, an elastic layer 30, made of an insulating material, and having a thickness of 0.1–2 μm, is deposited on top of the thin film sacrificial layer 20 including the empty cavities by using a CVD method.

In a next step, there is created an array of M×N contact holes 37 on the elastic layer 30 by using an etching method, wherein each of the contact holes 37 exposes one top of the connecting terminals 14 and has inner surfaces (not shown), as shown in FIG. 1B.

Then, a second thin film layer 40, made of an electrically conducting material, and having a thickness of 0.1–2 μm, is deposited on top of the elastic layer 30 including the inner surfaces of each of the contact holes 37 by using a sputtering or a vacuum evaporation method.

Next, a thin film electrodisplacive layer 50, made of a piezoelectric or an electrostrictive material, and having a thickness of 0.1–2 μm, is deposited on top of the second thin film layer 40 by using a CVD method, an evaporation method, a Sol-Gel method or a sputtering method. The thin film electrodisplacive layer 50 is then heat treated to allow a phase transition to take place, as shown in FIG. 1C.

In an ensuing step, a first thin film layer 60, made of an electrically conducting and light reflecting material, and having a thickness of 0.1–2 μm, is deposited on top of the thin film electrodisplacive layer 50 by using a sputtering or a vacuum evaporation method, as shown in FIG. 1D.

After the above step, the first thin film 60, the thin film electrodisplacive 50, the second thin film 40 and the elastic layers 30 are, respectively, patterned, until top of the thin film sacrificial layer 20 is exposed, by using an etching method, e.g., a photolithography or a laser trimming method, thereby forming an array of M×N actuating structures 90, each of the actuating structures 90 having a first thin film electrode 65, a thin film electrodisplacive member 55, a second thin film electrode 45 and an elastic member 35, as shown in FIG. 1E. Each of the second thin film electrodes 45 is electrically connected to a corresponding connecting terminal 14, thereby functioning as a signal electrode in each of the actuating structures 90. Each of the first thin film electrodes 65 is electrically connected to ground, thereby functioning as a mirror as well as a common bias electrode in each of the actuating structures 90.

Since each of the thin film electrodisplacive members 55 is sufficiently thin, there is no need to pole it in case it is made of a piezoelectric material: for it can be poled with the electric signal applied during the operation of the thin film actuated mirrors 101.

The preceeding step is followed by completely covering each of the actuating structures 90 with a thin film protection layer (not shown).

The thin film sacrificial layer 20 is then removed by using an etching method. Finally, the thin film protection layer is removed, thereby forming the array 100 of M×N thin film actuated mirrors 101, as shown in FIG. 1F.

There are a number of problems associated with the contact hole 37 shown in a detailed view of FIG. 1G, however, one of them being the formation of cracks 57. The heat treatment followed by the rapid cooling of the thin film electrodisplacive layer 50 results in the formation of cracks 57 at a portion of the thin film electrodisplacive layer 50 deposited on top of the contact hole 37. The cracks 57 may lead to an establishment of an electrical connection between the first thin film electrode 65 which is subsequently formed on top of the thin film electrodisplacive member 55 and the second thin film electrode 45, resulting in a short-circuit therebetween. Since the first thin film electrode 65 in each of the actuating structures 90 is interconnected with other first thin film electrodes (not shown) in the same row or column in the array 100, if one of the actuating structures 90 becomes inoperable due the above reason, i.e., short-circuit, all of the other actuating structures 90 in the same row or column in the array 100 become inoperable.

SUMMARY OF THE INVENTION

It is, therefore, a primary object of the present invention to provide a method for the manufacture of an array of M×N thin film actuated mirrors for use in an optical projection system, the method being capable of minimizing the effect of a heat treatment involved in the manufacture thereof.

In accordance with one aspect of the present invention, there is provided a method for the manufacture of an array of M×N thin film actuated mirrors, wherein M and N are integers, for use in an optical projection system, the method comprising the steps of: providing an active matrix having an array of M×N connecting terminals; forming a contact member on top of each of the connecting terminals; forming a thin film sacrificial layer on top of the active matrix; forming an array of M×N actuating structures on top of the thin film sacrificial layer, wherein each of the actuating structures has a first thin film electrode, a thin film electrodisplacive member, a second thin film electrode and an elastic member having a contact hole; and removing the thin film sacrificial layer, thereby forming the array of M×N thin film actuated mirrors.

BRIEF DESCRIPTION OF THE DRAWINGS

The above and other objects and features of the present invention will become apparent from the following description of the preferred embodiments, when given in conjunction with the accompanying drawings, wherein.

DETAILED DESCRIPTION OF THE PREFERRED EMBODIMENTS

Figure 1A:
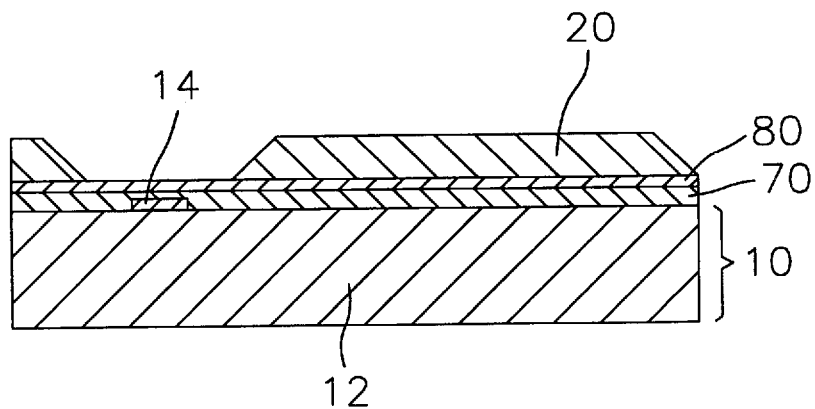
FIGS. 1A to 1F present schematic cross sectional views illustrating a method for the manufacture of an array of M×N thin film actuated mirrors previously disclosed.
Figure 1B:
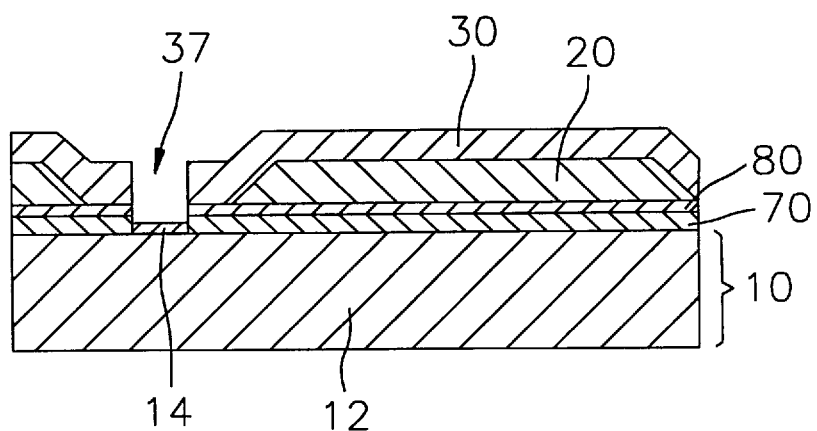
Figure 1C:
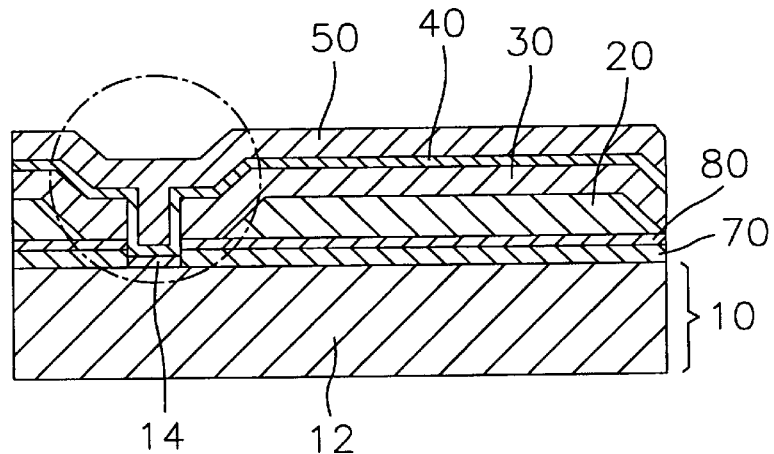
Figure 1G:
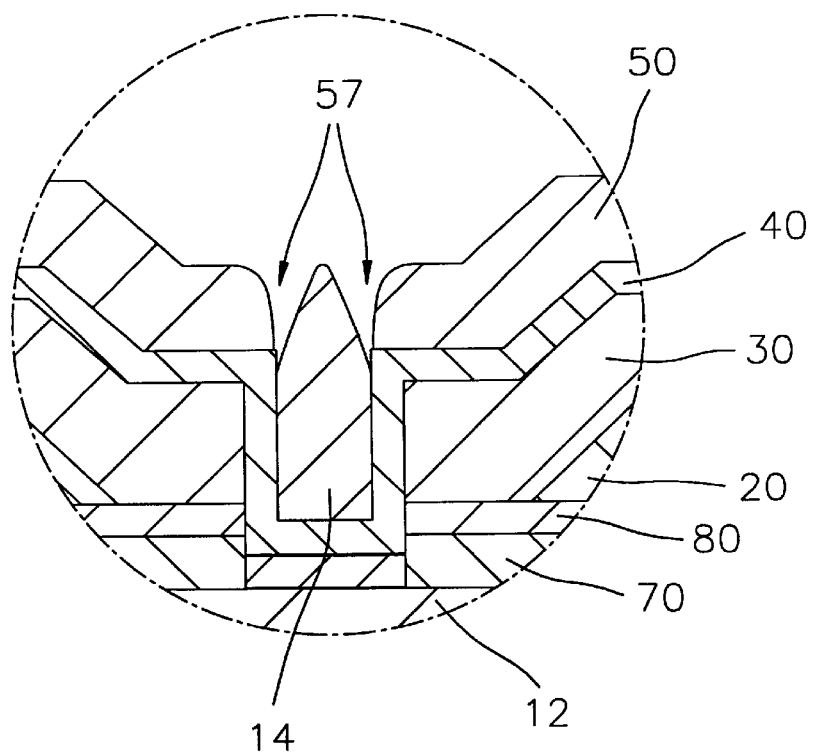
FIG. 1G provides an detailed view depicting a portion of the structure shown in FIG. 1C.
Figure 1D:
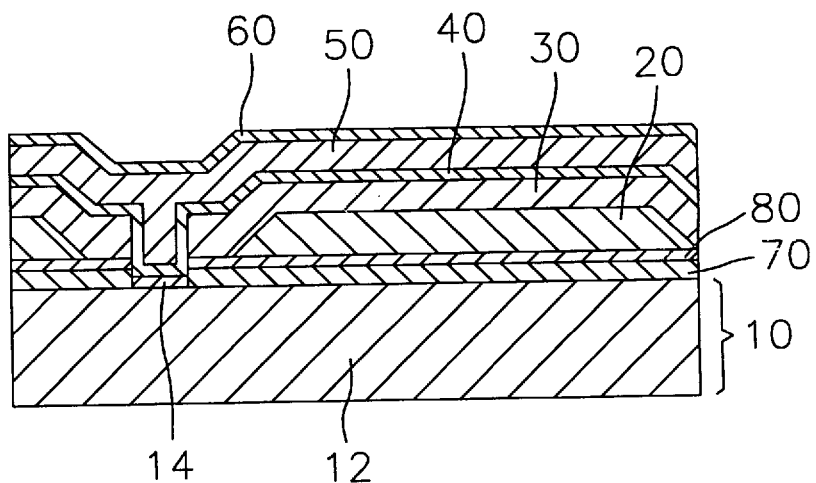
Figure 1E:
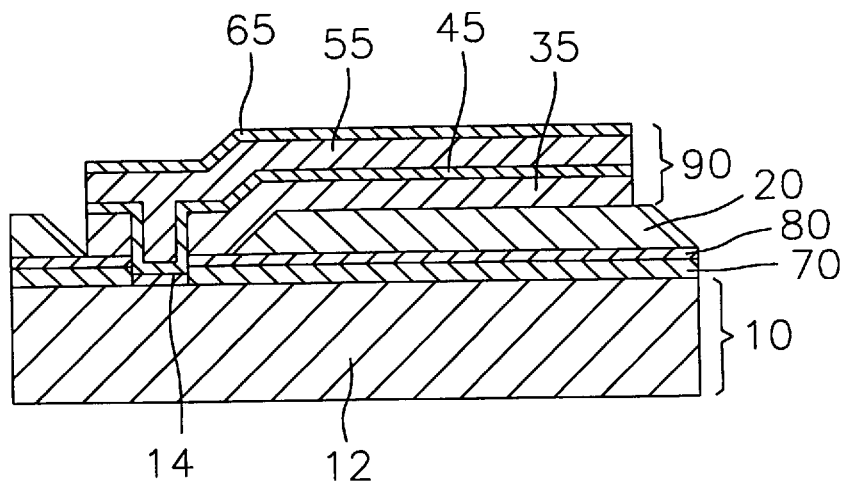
Figure 1F:
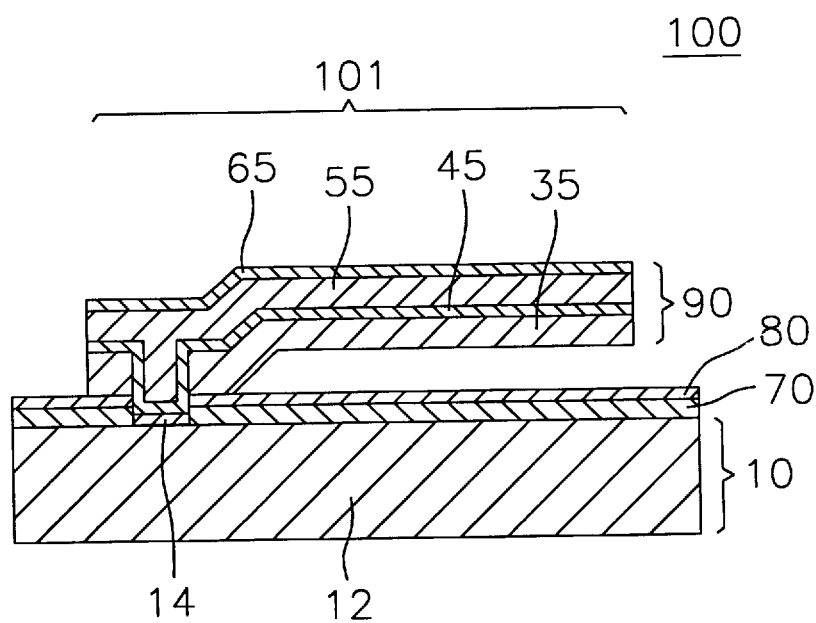

There are provided in FIGS. 2A to 2F schematic cross sectional views setting forth a method for the manufacture of an array 300 of M×N thin film actuated mirrors 301, wherein M and N are integers, for use in an optical projection system, in accordance with the present invention. It should be noted that like parts appearing in FIGS. 2A to 2F are represented by like reference numerals.

The process for the manufacture of the array 300 begins with the preparation of an active matrix 210 including a substrate 212 with an array of M×N connecting terminals 214 formed on top of the substrate 212 and an array of M×N transistors (not shown), wherein each of the connecting terminals 214 is electrically connected to a corresponding transistor in the array of transistors.

Then, a contact member 216 made of an electrically conducting material, e.g., Pt, is formed on top of each of the connecting terminals 214 by first depositing a contact layer (not shown), made of the electrically conducting material, on top of the active matrix 210, using a sputtering, a evaporation or a chemical vapor deposition (CVD) method, and then selectively removing the contact layer, using an etching method, e.g., reactive ion etching (RIE) method or ion milling method, resulting in the contact member 216 formed on top of each of the connecting terminals 214. The contact member 216 has a top surface.

In a subsequent step, there is deposited a passivation layer 270, made of, e.g., PSG or silicon nitride, and having a thickness of 0.1–2 $\mu$m, on top of the active matrix 210 by using, e.g., a CVD or a spin coating method, wherein the passivation layer 270 has a top surface.

Figure 2A:
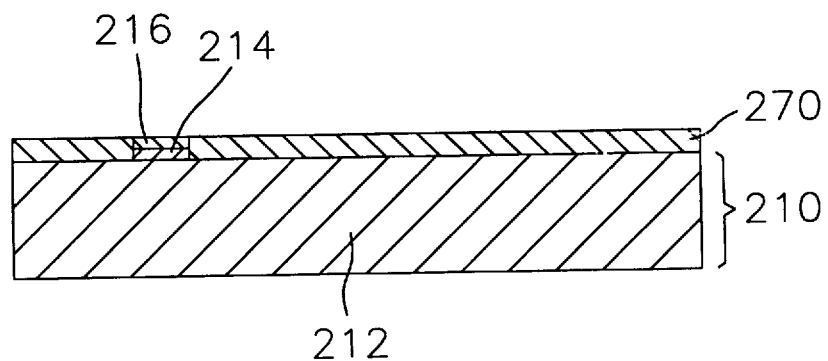
FIGS. 2A to 2F provide schematic cross sectional views setting forth a method for the manufacture of an array of M×N thin film actuated mirrors in accordance with the present invention.

In an ensuing step, the top surface of the passivation layer 270 is planarized, until the top surface of the contact member 216 is exposed, by using a chemical mechanical polishing (CMP) method, thereby providing a flat top surface of the passivation layer 270 and the contact member 216, as shown in FIG. 2A.

Thereafter, an etchant stopping layer 280, made of a nitride, and having a thickness of 0.1–2 $\mu$m, is deposited on the flat top surface of the passivation layer 270 and the contact member 216 by using, e.g., a sputtering or a CVD method.

In a next step, there is deposited on top of the etchant stopping layer 280 a thin film sacrificial layer 220, having a thickness of 0.1–2 $\mu$m, and made of a metal, e.g., copper (Cu) or nickel (Ni), a phosphor-silicate glass (PSG) or a poly-Si. The thin film sacrificial layer 220 is deposited by using a sputtering or an evaporation method if the thin film sacrificial layer 220 is made of a metal, a chemical vapor deposition (CVD) method or a spin coating method if the thin film sacrificial layer 220 is made of a PSG, or a CVD method if the thin film sacrificial layer 220 is made of a poly-Si.

Figure 2B:
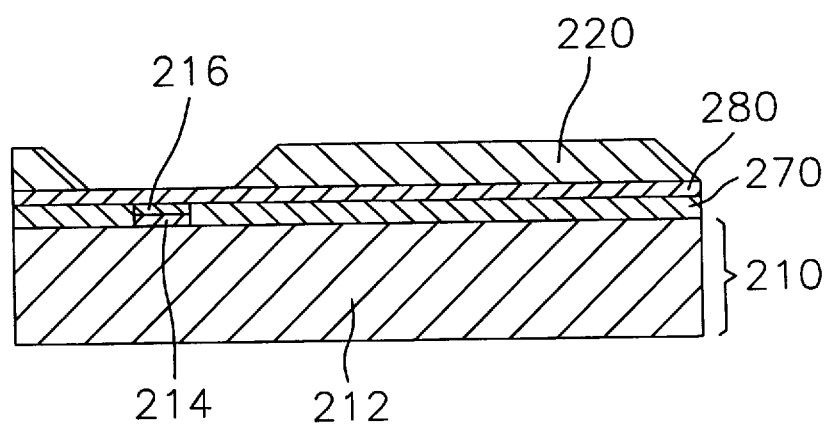

In a following step, there is formed an array of M×N pairs of empty cavities (not shown) on the thin film sacrificial layer 220 by using an etching method, as shown in FIG. 2B. Each of the empty cavities in each pair encompasses one of the contact members 216 formed on top of the connecting terminals 214.

Subsequently, an elastic layer 230, made of an insulating material, e.g., silicon nitride, and having a thickness of 0.1–2 $\mu$m, is deposited on top of the thin film sacrificial layer 220 including the empty cavities by using a chemical vapor deposition (CVD) method.

Figure 2C:
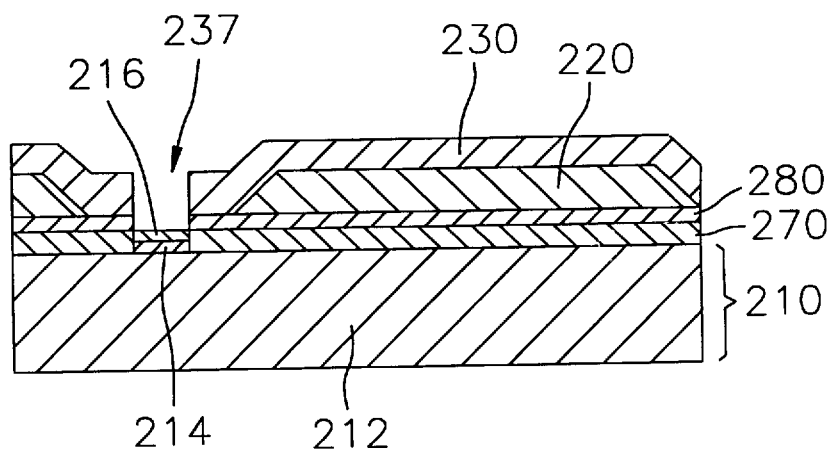

In an ensuing step, there is created an array of M×N contact holes 237 on the elastic layer 230 by using an etching method, as shown in FIG. 2C, wherein each of the contact holes 237 exposes one top of the contact members 216 and has inner surfaces (not shown).

Then, a second thin film layer 240, made of an electrically conducting material, e.g., Pt/Ta, and having a thickness of 0.1–2 $\mu$m, is deposited on top of the elastic layer 230 including the inner surfaces of each of the contact holes 237 by using a sputtering or a vacuum evaporation method.

Next, a thin film electrodisplacive layer 250, made of a piezoelectric material, e.g., PZT, or an electrostrictive material, e.g., PMN, and having a thickness of 0.1–2 $\mu$m, is deposited on top of the second thin film layer 240 by using a CVD method, an evaporation method, a Sol-Gel method or a sputtering method. The thin film electrodisplacive layer 250 is then heat treated to allow a phase transition to take place.

Figure 2D:
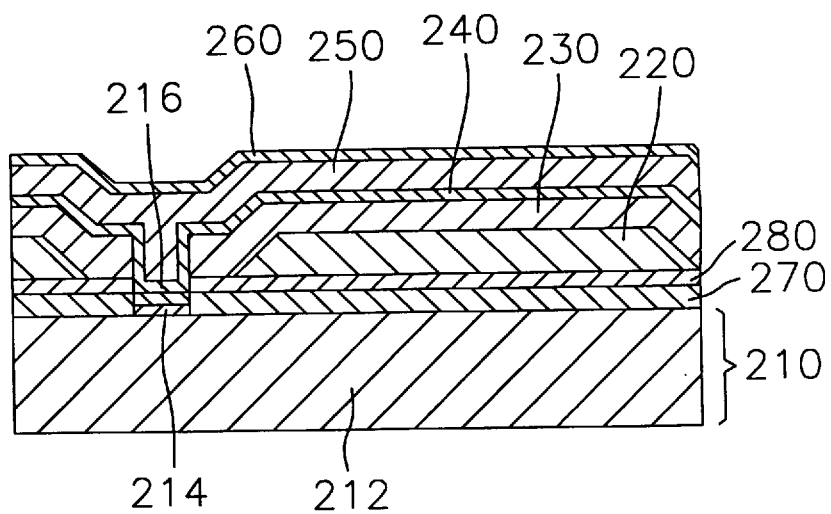

In a next step, a first thin film layer 260, made of an electrically conducting and light reflecting material, e.g., aluminum (Al) or silver (Ag), and having a thickness of 0.1–2 $\mu$m, is deposited on top of the thin film electrodisplacive layer 250 by using a sputtering or a vacuum evaporation method, as shown in FIG. 2D.

Figure 2E:
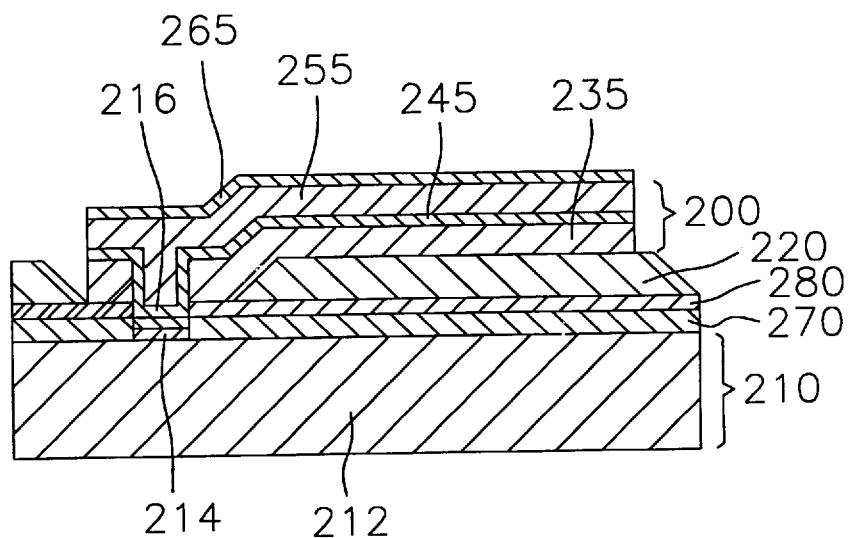

After the above step, the first thin film 260, the thin film electrodisplacive 250, the second thin film 240 and the elastic layers 230 are, respectively, patterned, until top of the thin film sacrificial layer 220 is exposed, by using a photolithography or a laser trimming method, thereby forming an array of M×N actuating structures 200, wherein each of the actuating structures 200 has a first thin film electrode 265, a thin film electrodisplacive member 255, a second thin film electrode 245 and an elastic member 235 having the contact hole 237, as shown in FIG. 2E. Each of the second thin film electrodes 245 is electrically connected to a corresponding connecting terminal 214 through the contact member 216, thereby functioning as a signal electrode in each of the actuating structures 200. Each of the first thin film electrodes 265 is electrically connected to ground, thereby functioning as a mirror as well as a common bias electrode in each of the actuating structures 200.

Since each of the thin film electrodisplacive members 255 is sufficiently thin, there is no need to pole it in case it is made of a piezoelectric material: for it can be poled with the electric signal applied during the operation of the thin film actuated mirrors 301.

Figure 2F:
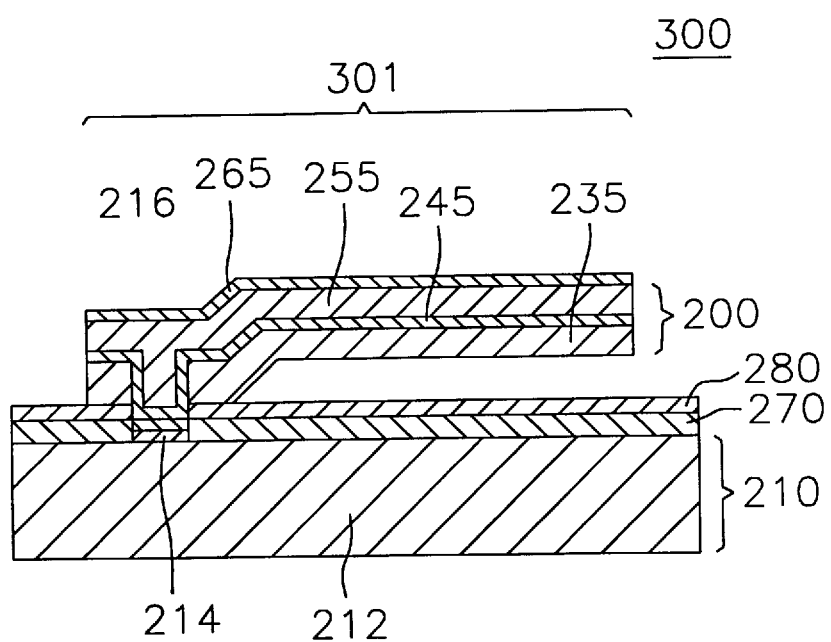

Finally, the thin film sacrificial layer 220 is removed, thereby forming the array 300 of M×N thin film actuated mirrors 301, as shown in FIG. 2F.

In the inventive method for the manufacture of the array 300 of M×N thin film actuated mirrors 301, since the contact member 216 formed on top of the connecting terminal 214 reduce the depth of the contact hole 237, cracks may not form on the thin film electrodisplacive layer 250 during the heat treatment thereof, thereby preventing the thin film electrodes in each of the actuating structures 200 from coming into an electrical contact with each other, which, in turn, prevents a short-circuit therebetween.

While the present invention has been described with respect to certain preferred embodiments only, other modifications and variations may be made without departing from the scope of the present invention as set forth in the following claims.

What is claimed is:

1. A method for the manufacture of an array of thin film actuated mirrors, the method comprising the steps of:

providing an active matrix having an array of connecting terminals;

forming a contact member on top of each of the connecting terminals;

forming a thin film sacrificial layer on top of the active matrix;

forming an array of actuating structures on top of the thin film sacrificial layer, wherein each of the actuating structures has an elastic member having a contact hole, a second thin film electrode, a thin film electrodisplacive member and a first thin film electrode; and removing the thin film sacrificial layer, thereby forming the array of thin film actuated mirrors.

2. The method of claim 1, wherein the contact member is formed by first depositing a contact layer on top of the active matrix having an array of connecting terminals, and then selectively removing a portion of the contact layer.

3. The method of claim 2, wherein the contact layer is deposited on top of the active matrix by using a sputtering, an evaporation or a chemical vapor deposition (CVD) method.

4. The method of claim 2, wherein the contact layer deposited on top of the active matrix is made of an electrically conducting material.

5. The method of claim 2, wherein the portion of the contact layer is selectively removed by using a reactive ion etching (RIE) method or an ion milling method.

6. A method for the manufacture of an array of thin film actuated mirrors, the method comprising the steps of:

providing an active matrix having an array of connecting terminals;

forming a contact member on top of each of the connecting terminals;

depositing a passivation layer on top of the active matrix after the formation of the contact member;

forming a thin film sacrificial layer on top of the passivation layer:

forming an array of actuating structures on top of the thin film sacrificial layer; wherein each of the actuating structures has an elastic member having a contact hole, a second thin film electrode, a thin film electrodisplacive member and a first thin film electrode; and removing the thin film sacrificial layer, thereby forming the array of thin film actuated mirrors.

7. The method of claim 6, wherein the passivation layer is planarized after the deposition thereof.

8. The method of claim 7, wherein the passivation layer is planarized by using a chemical mechanical polishing (CMP) method.

9. The method of claim 8, further comprises a step of depositing an etchant stopping layer on top of the passivation layer after the planarization of the passivation layer.

10. A method for the manufacture of an array of thin film actuated mirrors, the method comprising the steps of:

providing an active matrix comprising a substrate having an array of connecting terminals formed thereon;

forming a contact member on top of each of the connecting terminals;

forming a thin film sacrificial layer on top of the resulting structure;

selectively removing a portion of the thin film sacrificial layer in a region above each of the contact members;

forming an elastic layer on top of the resulting structure;

forming a contact hole in at least said elastic layer such that each of the contact members are exposed;

forming a second thin film layer on top of the resulting structure, said second thin film layer forming an electrical contact with each of the contact members;

forming an electrodisplacive layer atop said second thin film layer;

forming a first thin film layer on top of the electrodisplacive layer; and removing a remaining portion of the thin film sacrificial layer.

11. The method of claim 10, further comprising the step of depositing a passivation layer after the step of forming contact members on each of the connecting terminals.

12. The method of claim 11, further comprising the step of planarizing the passivation layer such that said contact members are exposed.

13. The method of claim 12, further comprising the step of deposition an etchant stopping layer atop the planarized passivation layer and the contact members.

* * * * *